(12) United States Patent
Alberti et al.

(10) Patent No.: US 11,939,076 B2
(45) Date of Patent: Mar. 26, 2024

(54) AVIONIC EXHAUST AIR FOR COOLING ENGINE BAY

(71) Applicant: Lockheed Martin Corporation, Bethesda, MD (US)

(72) Inventors: Giuseppe S. Alberti, Shelton, CT (US); Adriano Cirioli, North Haven, CT (US); Sean Thomas Barrows, Stratford, CT (US); Nolan John Birtwell, Southbury, CT (US); Michael Alexander, Bridgeport, CT (US); Nicholas Scott Coury, Shelton, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 275 days.

(21) Appl. No.: 17/464,532

(22) Filed: Sep. 1, 2021

(65) Prior Publication Data

US 2023/0060791 A1 Mar. 2, 2023

(51) Int. Cl.
*B64D 33/08* (2006.01)
*A62C 3/08* (2006.01)
*F01P 7/02* (2006.01)

(52) U.S. Cl.
CPC ............. *B64D 33/08* (2013.01); *A62C 3/08* (2013.01); *F01P 7/026* (2013.01); *F01P 2050/20* (2013.01)

(58) Field of Classification Search
CPC ........... B64D 2013/0614; B64D 33/08; F01P 2001/005; F01P 2025/48; F01P 2031/20; F01P 2031/22; F01P 1/06; F01P 7/023; F01P 7/026; F01P 2050/20; A62C 3/08; A62C 2/06; A62C 3/0207; F16L 5/00; F16L 5/04

See application file for complete search history.

(56) References Cited

U.S. PATENT DOCUMENTS

| | | | | |
|---|---|---|---|---|
| 4,566,542 | A * | 1/1986 | Enk | A62C 3/08 169/62 |
| 4,616,694 | A * | 10/1986 | Hsieh | E04H 1/1261 165/47 |
| 5,990,789 | A * | 11/1999 | Berman | A62C 3/00 109/31 |
| 6,899,184 | B2 * | 5/2005 | Reynolds | A62C 3/08 169/61 |
| 2003/0014963 | A1 * | 1/2003 | Aramburu | A62C 3/08 60/801 |
| 2012/0240882 | A1 | 9/2012 | Gao et al. | |
| 2017/0281996 | A1 * | 10/2017 | Chattaway | A62C 35/645 |
| 2017/0361139 | A1 * | 12/2017 | Koreis | A62C 3/16 |
| 2020/0147425 | A1 * | 5/2020 | Wright | A62C 2/247 |

\* cited by examiner

*Primary Examiner* — Jenna M Hopkins
(74) *Attorney, Agent, or Firm* — Foley & Lardner LLP

(57) ABSTRACT

An aircraft includes an airframe defining a first enclosed space, an engine bay disposed within the first enclosed space, and a cooling system. The engine bay includes a firebox defining a second enclosed space and an engine disposed at least partially within the second enclosed space. The cooling system is configured to selectively fluidly couple the first enclosed space with the second enclosed space.

20 Claims, 5 Drawing Sheets

US 11,939,076 B2

AVIONIC EXHAUST AIR FOR COOLING ENGINE BAY

STATEMENT REGARDING FEDERALLY SPONSORED RESEARCH OR DEVELOPMENT

This invention was made with Government support under Agreement No. W911W6-19-9-0005, awarded by the Army Contracting Command-Redstone Arsenal. The Government has certain rights in the invention.

FIELD

The present disclosure relates generally to the field of aircraft. More specifically, the present disclosure relates to a cooling system for providing cooling air to an engine onboard an aircraft.

BACKGROUND

Fixed and rotary-wing aircraft (e.g., helicopters) generally include an engine compartment or bay in which the engine for the aircraft is located. The aircraft may also include a containment structure around the engine, separating the fuselage into different areas or bays, and protecting other parts of the aircraft in case a fire breaks out in the engine compartment. The aircraft may further include avionics equipment to facilitate flight operations (e.g., maneuvering the aircraft, etc.) and/or monitor aircraft performance. The equipment housed in these various bays of the aircraft must be vented to the outside environment to prevent the equipment from overheating and breaking down. Generally, the hot cooling air is vented from the aircraft through penetrations in the skin of the aircraft. However, these penetrations can increase drag on the aircraft and reduce the aircraft's maximum airspeed. Additionally, the hot air can increase the surface temperature of the aircraft near the penetrations and increase the aircraft's infrared signature.

SUMMARY

One aspect of the present disclosure relates to an aircraft. The aircraft includes an airframe defining a first enclosed space, an engine bay disposed within the first enclosed space, and a cooling system. The engine bay includes a firebox defining a second enclosed space and an engine disposed at least partially within the second enclosed space. The cooling system is configured to selectively fluidly couple the first enclosed space with the second enclosed space.

Another aspect of the present disclosure relates to an engine cooling system for an aircraft. The engine cooling system includes a fire resistant bulkhead, a fluid conduit, a valve, and an air driver. The fire resistant bulkhead includes a forward wall and a lower wall coupled to the forward wall and angled with respect to the forward wall. The forward wall and the lower wall together define an at least partially enclosed space sized to receive an engine therein. The fluid conduit is coupled to one of the forward wall and the lower wall and extends away from the at least partially enclosed space. The valve is coupled to a first end of the fluid conduit proximate the fire resistant bulkhead and is configured to control a flow of air through the fluid conduit. The air driver is coupled to a second end of the fluid conduit opposite the first end.

Yet another aspect of the present disclosure relates to an engine cooling system for an aircraft. The engine cooling system includes a fireproof valve that is repositionable between an open position and a closed position, a valve actuator coupled to the fireproof valve, a user interface, and a fire suppression controller. The fire suppression controller is communicably coupled to the valve actuator and the user interface. The fire suppression controller is configured to (i) receive an arm command from the user interface; (ii) transmit a first signal to the valve actuator to move the fireproof valve from the open position to the closed position in response to receiving the arm command; and (iii) transmit a second signal to the user interface that indicates a position of the fireproof valve.

This summary is illustrative only and should not be regarded as limiting.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
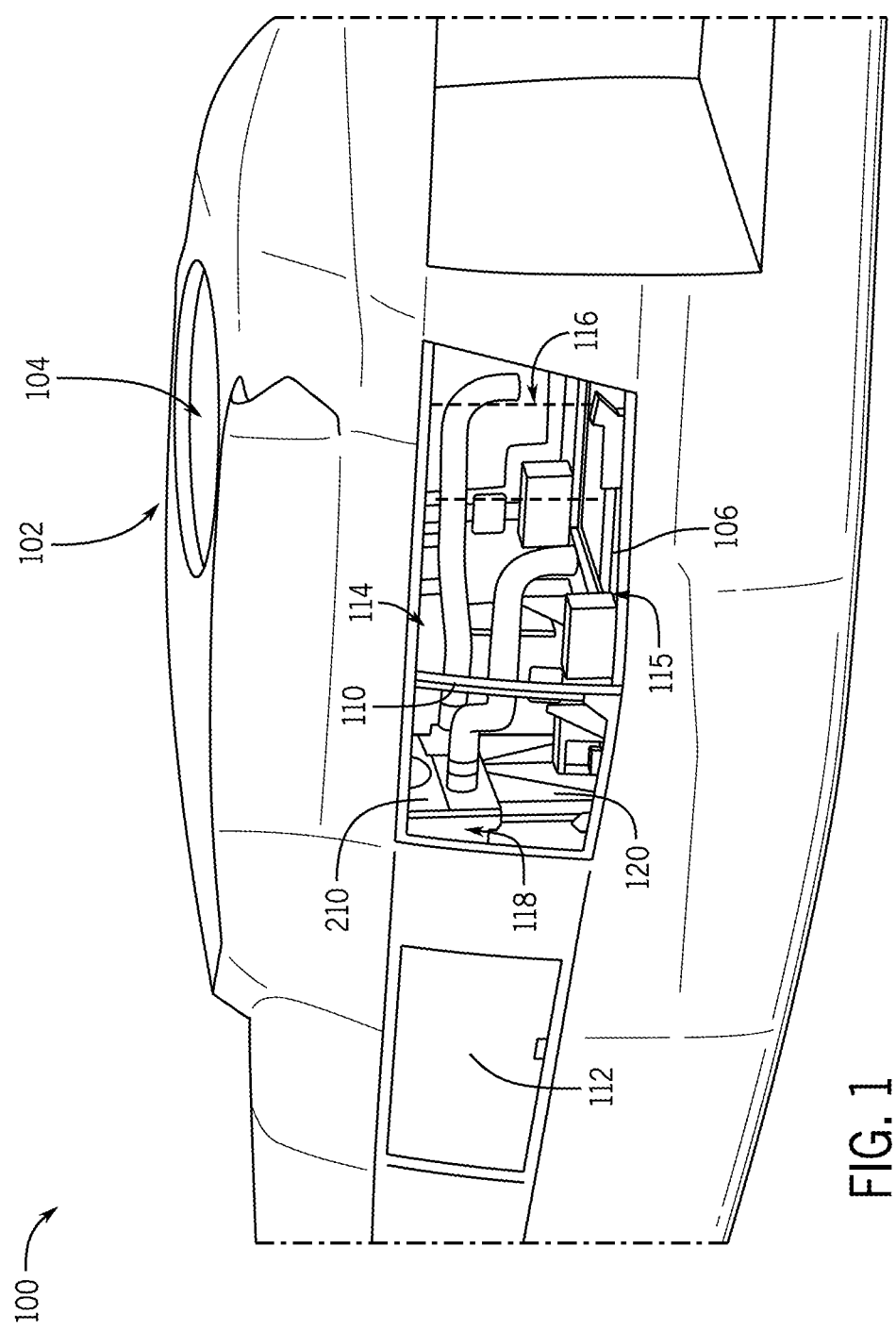
FIG. 1 is a perspective view of a rotary-wing aircraft, according to an embodiment.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Fixed and rotary-wing aircraft often circulate fresh ambient air through different parts of the fuselage to maintain avionics and other flight equipment at reasonable temperature levels during flight operations. The fresh air flowing across the avionics equipment may be vented overboard, through penetrations (e.g., openings, slots, etc.) in the skin of the fuselage. These penetrations can increase the overall drag on the aircraft and reduce the maximum flight speeds (e.g., airspeed) that can be achieved. Additionally, the hot air flowing across the skin of the aircraft from the penetrations can raise surface temperatures along the skin and increase the overall heat signature of the aircraft. Separate flows of cooling air may be required to cool the engine, which may be at least partially isolated from other aircraft equipment by a containment structure (e.g., firewalls) that helps protect other parts of the aircraft in the event of an engine fire. However, the space constraints in the aircraft, as well as the variation in air flow rates at different operating speeds and ambient conditions, may make it difficult to ensure sufficient cooling.

The aircraft design of the present disclosure mitigates the aforementioned cooling and aircraft performance issues by rerouting air from the avionics bay of the aircraft through the containment structure (e.g., firewall, firebox, etc.) between the avionics bay and the engine bay, and across the engine during flight operations. In particular, the aircraft of the present disclosure includes an engine cooling system having a plurality of fluid conduits coupled to the containment structure and extending away from the containment structure and into the avionics bay. The conduits feed air from the avionics bay into the containment structure to facilitate engine cooling. To maintain the fire integrity of the containment structure, the system also includes a plurality of substantially fireproof valves that are configured to seal off the conduits when a fire is present in the engine bay. In at least one embodiment, a single valve is coupled to a respective one of the fluid conduits proximate the containment structure. The valves are structured to withstand prolonged exposure to high temperatures without compromising the functionality of the valve. Additionally, the valves are structured to move from an open position to a closed position within a threshold period of time to reduce the risk of fire propagating out from the engine bay, along the fluid conduits, and into other parts of the aircraft. In at least one embodiment, the system further includes a plurality of fans coupled to the plurality of conduits that move air from the avionics bay through the tubes and into the containment structure.

In at least one embodiment, the system includes a controller configured to control operation of the valve and/or fans during a fire event. In some embodiments, the controller may form part of a fire suppression system for the aircraft that is used to detect a fire and/or introduce a fire suppression agent into the containment structure during a fire. The controller may be configured to actuate (e.g., close) the valve in response to the detection of fire within the engine bay. For example, the controller may be configured to receive an indication of fire from a thermal sensor that is disposed within or directed toward the engine bay, by monitoring the temperature of air within the engine bay. The control may be configured to close the valve in response to the temperature exceeding threshold valves. In some embodiments, the controller may also be configured to actuate the valves in response to operator commands. The controller may be configured to close the valves prior to the injection of fire suppression agent into the engine bay, as part of the arming processes for the fire suppression system, or in combination with the introduction of fire suppression agent into the engine bay. Beneficially, the controller may be configured to provide an indication of valve position to the aircraft's operators to confirm their functionality, and to signal the operators when the containment structure has been sealed and when to introduce the fire suppression agent. The controller may also be configured to deactivate the fans in the event of fire to prevent damage to the fans (e.g., to prevent the fans from stalling) and further reduce the risk of oxygen introduction into the containment structure, which would otherwise feed the fire.

The engine cooling system of the present disclosure eliminates the need for penetrations in the outer skin of the aircraft to vent air from the avionics bay which, beneficially, reduces drag on the aircraft and the overall infrared signature of the aircraft. The cooling system also ensures a more uniform mass flow rate of air into the containment structure during aircraft operations, as opposed to having the ambient conditions in the outside environment and the flight modes determine the mass air flow provided for engine cooling. Moreover, the air from the avionics bay helps reduce the temperature of the air that is exhausted from the engine bay, further reducing the aircraft's overall infrared signature. In the event of fire, the controller is configured to rapidly close the valves between the avionics and engine bays, reducing the risk of fire propagation into other parts of the aircraft as well as the concentration of fire suppression agent required to fight a potential fire. Valve closure also prevents the agent cloud from dissipating as fast as in an open nacelle, and reduces the quantity of air introduction into the engine bay that feeds the fire.

Various numerical values herein are provided for reference purposes only. Unless otherwise indicated, all numbers expressing quantities of properties, parameters, conditions, and so forth, used in the specification and claims are to be understood as being modified in all instances by the term "approximately." Accordingly, unless indicated to the contrary, the numerical parameters set forth in the following specification and attached claims are approximations. Any numerical parameter should at least be construed in light of the number reported significant digits and by applying ordinary rounding techniques. The term "approximately" when used before a numerical designation, e.g., a quantity and/or an amount including range, indicates approximations which may vary by (+) or (−) 10%, 5%, or 1%.

As will be understood by one of skill in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

Referring to FIG. 1, an aircraft 100 is shown, according to at least one embodiment. The aircraft 100 is a rotary-wing aircraft (e.g., a helicopter) including a fuselage 102 (e.g., main body, airframe, etc.), a main rotor system 104 extending above the fuselage 102, a tail rotor system extending rearward of the fuselage 102, an engine driving the main and tail rotor systems, and avionics equipment 106 including engine controls, flight control system, navigation, communications, and other aircraft system controls. In other embodiments, the aircraft 100 may include additional, fewer, and/or different components. In yet other embodiments, the aircraft may be a fixed-wing aircraft (e.g., airplane), or another aircraft type.

The fuselage 102 is sized to hold aircraft equipment and crew. The fuselage 102 includes a frame 110 and an outer shell 112 (e.g., skin, etc.) coupled to the frame 110 and defining a first enclosed space 114 within the aircraft 100. The outer shell 112 may include a plurality of panels that are permanently secured to (e.g., welded to) the frame 110, or that are secured to the frame 110 using bolts, rivets, or another suitable fastener. In at least one embodiment, the outer shell 112 does not include any outlet openings (e.g., penetrations, vents, etc.) to vent air between the first enclosed space 114 and the environment surrounding the aircraft 100. In the embodiment of FIG. 1, the first enclosed space 114 includes an avionics bay 115 housing the avionics equipment 106. The first enclosed space 114 may also encompass at least a portion of the main rotor system 104 (e.g., main rotor pylon 116, etc.) for the aircraft 100, which extends vertically upwardly through the first enclosed space 114 and through a roof (e.g., upper wall, etc.) of the fuselage 102. The avionics equipment 106 may be disposed on either side of the main rotor pylon 116 at a lower end of the first enclosed space 114, or at another suitable location within the first enclosed space 114. The fuselage 102 may also include a partition (e.g., firewall, panel, door, etc.) separating the first enclosed space 114 from a cargo area of the aircraft and/or the aircraft cockpit.

As shown in FIG. 1, the aircraft 100 also includes a containment structure (e.g., nacelle, etc.), shown as firebox 118, disposed within the first enclosed space 114 toward a rear end of the first enclosed space 114, aft of the main rotor pylon 116. The firebox 118 houses the engine of the aircraft 100 and provides a substantially fireproof enclosure for the engine and engine accessories. In the embodiment of FIG. 1, the firebox 118 is at least partially suspended above the floor of the first enclosed space 114 by extension pieces 120 (e.g., legs, supports, etc.), which isolates the walls of the firebox 118 from other parts of the aircraft 100.

Figure 2:
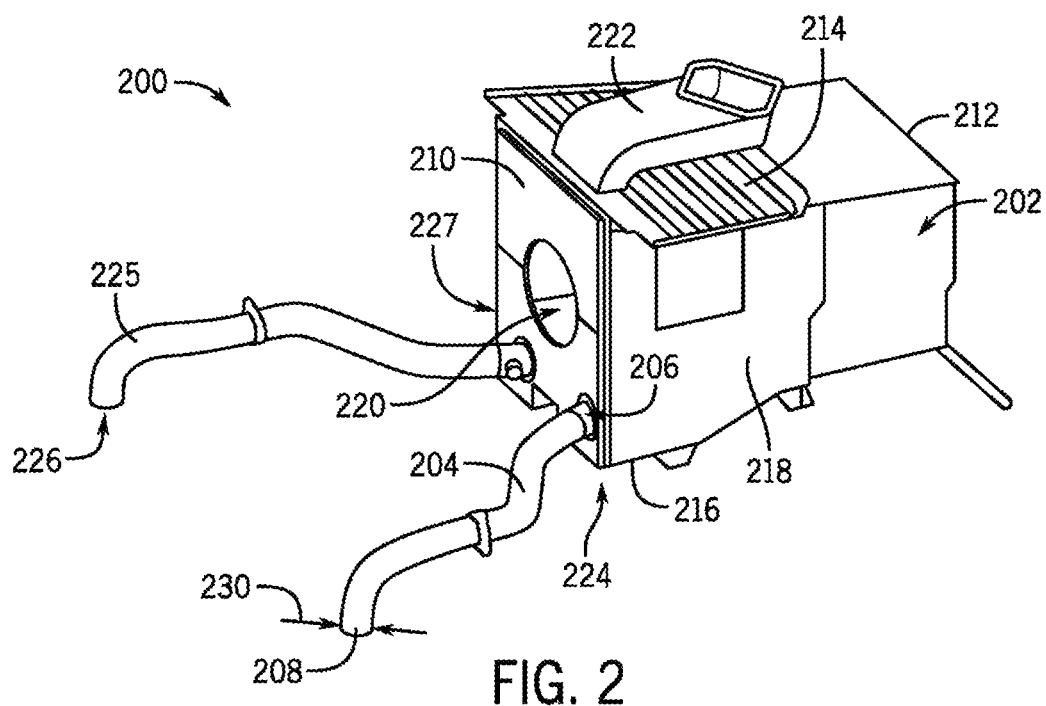
FIG. 2 is a perspective view of an engine cooling system for an aircraft, according to an embodiment.

In at least one embodiment, the firebox forms part of an engine cooling system for the aircraft 100 that routes cooler air from the first enclosed space 114 across the engine and engine accessories. Referring to FIG. 2, a perspective view of an engine cooling system 200 is shown, according to at least one embodiment. The engine cooling system 200 includes a firebox 202, a plurality of fluid conduits 204, a plurality of fireproof valves 206, and a plurality of air drivers 208. The engine cooling system 200 may also include a control system (e.g., controller) that controls operation of the fireproof valves 206 and air drivers 208. In other embodiments, the engine cooling system 200 may include additional, fewer, and/or different components.

The firebox 202 may be the same as or substantially similar to the firebox 118 described with reference to FIG. 1. The firebox 202 is a fire-resistant bulkhead that separates the engine and engine accessories from other parts of the aircraft 100. As shown in FIG. 2, the firebox 202 includes a plurality of firewalls including a forward wall 210, rear wall 212, upper wall 214, lower wall 216, and side walls 218. As shown in FIG. 1, the forward wall 210 may be arranged substantially perpendicular to the floor of the first enclosed space 114 and facing the main rotor pylon 116. The upper wall 214, lower wall 216, and side walls 218 are coupled to the outer ends of the forward wall 210 and extend away from the forward wall 210 at an angle (e.g., 90 degrees, etc.) toward a rear end of the aircraft 100. Together, the forward wall 210, rear wall 212, upper wall 214, lower wall 216, and side walls 218 form a second enclosed space, shown as engine bay 220, that is separated from the first enclosed space 114 (e.g., avionics bay) by the firebox 202. The forward wall 210, rear wall 212, upper wall 214, lower wall 216, and side walls 218 may include wall panels made from a substantially fireproof or fire resistant materials. For example, the wall panels may be made from stainless steel, titanium, and/or other substantially fireproof materials. In some embodiments, the firebox 202 may also include fireproof mats (e.g., blankets), grommets, bushings, and/or other firewall fittings to block any openings in the firebox 202 and to accommodate connections between the engine and other aircraft components.

As shown in FIG. 2, the firebox 202 also includes an upper air inlet 222 (e.g., snorkel, inlet duct, etc.) that fluidly couples the engine bay 220 to an environment surrounding the aircraft. The air inlet 222 is coupled to the upper wall 214 and extends away from the forward wall 210 toward a rear of the aircraft. The firebox 202 also includes an air outlet, which may form part of or include an ejector gap through the exhaust compartment that pulls air through the engine bay 220 and out with other exhaust air.

The fluid conduits 204 (e.g., ducts, tubes, etc.) are configured to direct air from the first enclosed space (e.g., first enclosed space 114 of FIG. 1, the avionics bay of the aircraft, etc.) into the engine bay 220. Multiple fluid conduits 204 are used to improve air circulation in the first enclosed space (e.g., avionics bay), which improves cooling for the avionic equipment by pulling air from different areas within the first enclosed space. In the embodiment of FIG. 2, the engine cooling system 200 includes two fluid conduits 204; however, the number of fluid conduits 204 may be different in other embodiments. The fluid conduits 204 are structured and positioned to increase the velocity of fresh air through the engine bay 220 and across the engine. In particular, the fluid conduits 204 are positioned to direct air into a lower portion of the engine bay 220, along regions of stagnant and/or recirculating air within the engine bay 220, to improve heat transfer between the air and the engine. As shown in FIG. 2, the fluid conduits 204 are coupled to the forward wall 210 of the firebox 202, at a lower end 224 of the forward wall 210 proximate the lower wall 216 (e.g., in lower corners of the forward wall 210, etc.). However, it will be appreciated that the position of the fluid conduits 204 may be different in other embodiments. For example, the fluid conduits 204 may be coupled to the lower wall 216 of the firebox 202 (e.g., to maintain high heat transfer rates between the air and the engine), side walls 218, upper wall 214, or some combination thereof.

As shown in FIG. 2, the fluid conduits 204 extend away from the forward wall 210 in a substantially perpendicular orientation relative to the forward wall 210 (e.g., toward the avionics bay). The fluid conduits 204 may extend at least partially away from one another, in an at least partially lateral direction, toward opposing sides of the avionics bay (e.g., a left side and a right side of the avionics bay). As shown in FIG. 2, the fluid conduits 204 each include a curved portion 225 (e.g., 90 degree transition) at an outer end 226 of the fluid conduit 204 that helps collect warm air from above the avionics equipment. In at least one embodiment, the fluid conduits 204 have an approximately constant hydraulic diameter between opposing ends of the conduits 204, which reduces back pressure on the air drivers and the accompanying risk of stall. In at least one embodiment, the fluid conduits 204 are made from a lightweight composite material and include multiple sections of conduit that are interconnected, although different materials and arrangements may be used in other embodiments (e.g., each fluid conduit 204 may be formed as a unitary body from a single piece of material).

Figure 3:
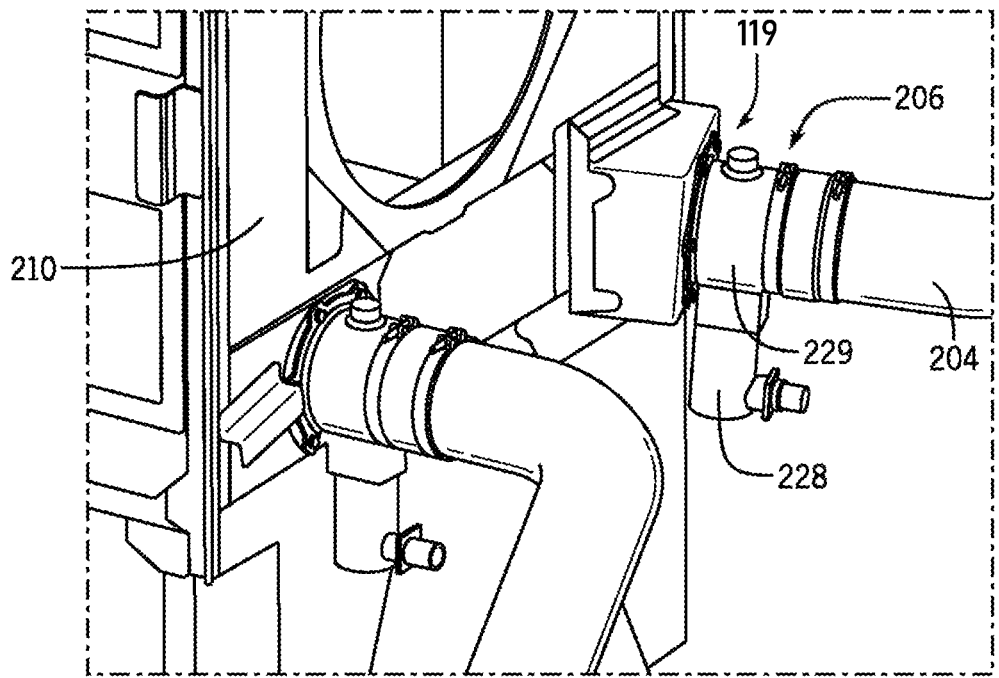
FIG. 3 is a perspective view of a forward wall portion of an engine cooling system for an aircraft, according to an embodiment.

As shown in FIGS. 2-3, the engine cooling system 200 includes fireproof valves 206 that fluidly couple the fluid conduits 204 to the firebox 202. The fireproof valves 206 (e.g., fire dampers, flow control valves, etc.) are structured to selectively prevent the flow of air from the first enclosed space into the engine bay 220. In the embodiment of FIGS. 2-3, the fireproof valves 206 couple the fluid conduits 204 to the forward wall 210 and are disposed between a first end 227 of the fluid conduits 204 and the forward wall 210. The position of the fireproof valves 206 substantially prevents fire from entering the fluid conduits 204 upon closure of the fireproof valves 206. In some embodiments, as shown in FIG. 3, the firebox 118 additionally includes standoffs 119 (e.g., protrusions, etc.) in the forward wall that facilitate mounting of the fireproof valves 206 to the forward wall. As used herein, the term "fireproof" when used to describe a component does not necessarily mean that the component cannot be damaged by fire, but rather that the component is substantially fireproof and/or fire resistant (e.g., as defined by an appropriate specification, etc.). For example, the fireproof valves 206 may be structured to maintain operability (e.g., remain operational to open and close in response to control signals and/or user commands) when exposed to extreme temperatures for at least a threshold period of time. In the embodiment of FIGS. 2-3, the fireproof valves 206 are structured to maintain operability when a valve body 229 of the valve is exposed to a temperature of approximately 2000° Fahrenheit for a period greater than or equal to approximately 90 seconds, which provides sufficient time for (i) the aircraft systems to identify the presence of a fire, (ii) the aircraft operator to confirm the fire visually and/or through other investigative approaches, and (iii) the aircraft operator to close the valve and initiating further remedial and/or fire suppression techniques. In other embodiments, the properties of the fireproof valve 206 may be different.

In the embodiment of FIGS. 2-3, the fireproof valve 206 is an electronic control valve that includes a valve body 229 and a valve actuator 228 coupled to the valve body 229. The valve actuator 228 may include a damper that rotates in response to a control signal between an open position in which flow can pass freely through the fireproof valve 206 and a closed position in which flow is substantially prevented from flowing through the fireproof valve 206. The electronic control valve may be a normally closed valve having a spring that biases the valve into the closed position in the absence of an electronic signal to the valve. Among other benefits, this ensures that the valve will be driven to the closed position in the event the electronics system fails (e.g., due to fire, etc.). In other embodiments, the fireproof valve 206 may be a normally open valve or another valve type. In at least one embodiment, the fireproof valve 206 also includes a mechanical actuator that can be manually manipulated by the pilot to actuate the valve independently from the electronic control. Among other benefits, the mechanical actuator provides a backup in case of electronics equipment failure or burnup.

In at least one embodiment, the fireproof valves 206 are snap-type valves that are configured to close rapidly in response to an indication of fire and/or operator commands. Among other benefits, limiting the maximum actuation time for the fireproof valves 206 reduces the potential for component failure during a fire, and limits the time that a fire has to propagate from the engine bay 220 to other parts of the aircraft. In the embodiment of FIGS. 2-3, the valve actuator 228 of the fireproof valves 206 is configured to actuate (e.g., move, reposition, etc.) the valve from the open position to the closed position within a closure period that is less than or equal to approximately 2 seconds. In other embodiments, the closure period may be different.

The air drivers 208 are coupled to second ends (open ends, free ends, inlet ends, etc.) of the plurality of fluid conduits 204 and are configured to move air from the first enclosed space of the aircraft, through the fluid conduits 204 and into the engine bay 220. In the embodiment of FIG. 2, an outlet of each air driver 208 is directly coupled to the second end of a respective one of the fluid conduits 204. A hydraulic diameter 230 (e.g., inner diameter) of each of the fluid conduits 204 may be approximately equal to a size (e.g., diameter) of an outlet of the air driver 208 which, beneficially, reduces backpressure on the air driver 208 and prevents stall during operation. In the embodiment of FIG. 2, the size of the outlet of the air driver 208 is approximately 4 inches. However, the exact size of the outlet and hydraulic diameter of the fluid conduits 204 may be different in other embodiments. In at least one embodiment, the air drivers 208 are single and/or variable speed fans (e.g., avionic cooling fans) and may include variable frequency fans, fixed frequency fans, direct current fans, or some combination thereof. The engine cooling system 200 may also include auxiliary air drivers disposed in the avionics bay and configured to provide additional circulation of air within the avionics bay.

Figure 4:
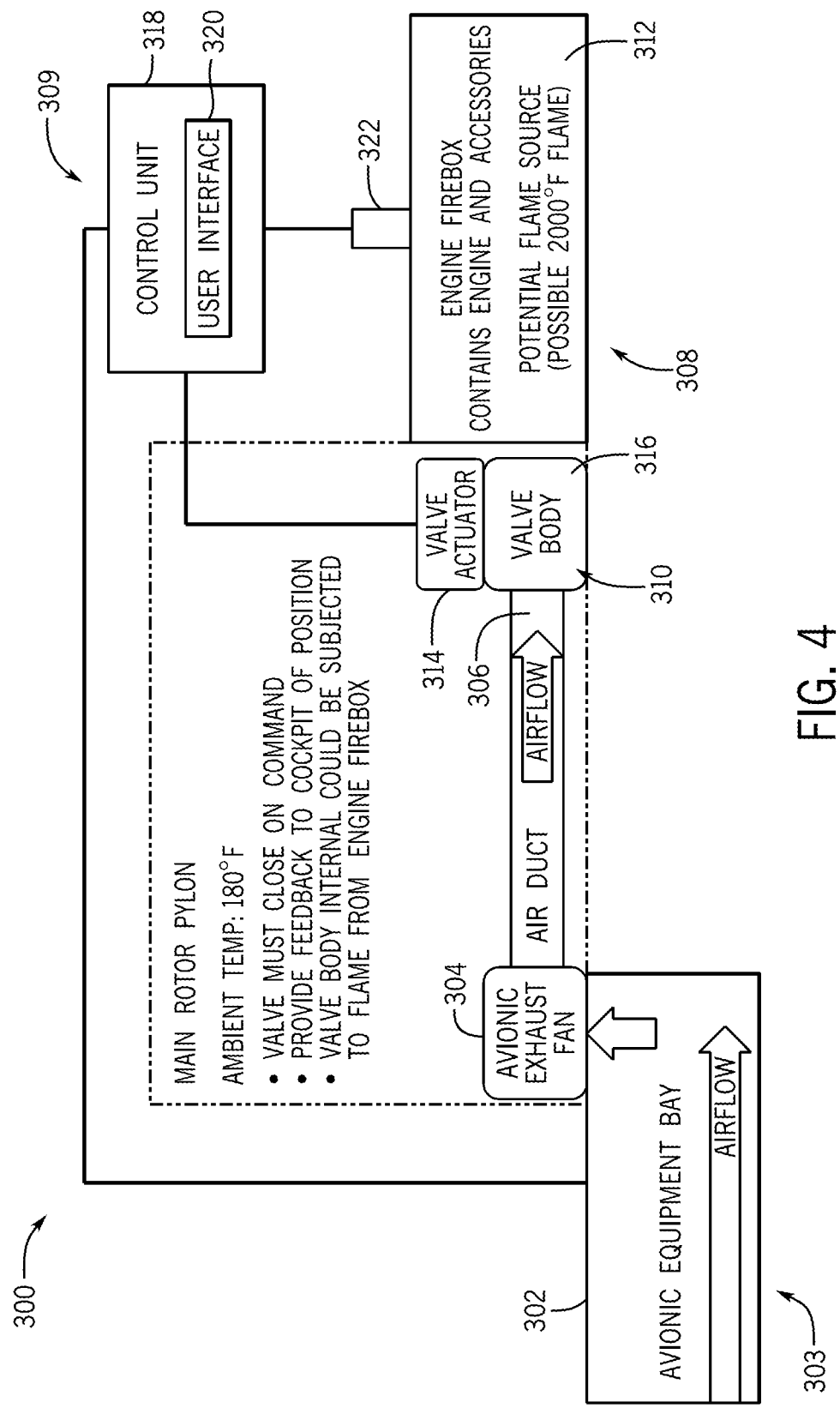
FIG. 4 is a block diagram of an engine cooling system for an aircraft, according to an embodiment.

Referring to FIG. 4, a block diagram of an engine cooling system 300 for an aircraft is shown, according to at least one embodiment. As shown, warm air within a range between approximately 1200 Fahrenheit and 180° Fahrenheit is directed from the avionics bay 302 by an air driver 304 into the fluid conduits 306 that fluidly couple the avionics bay 302 to a firebox 308. This may include routing the warm air past the main rotor pylon of the aircraft within a first enclosed space 303. During normal flight operations, the fluid conduits 306 direct the warm air to a fireproof valve 310 and into the firebox 308 (e.g., engine bay 312), which operates at higher temperatures than the warm air entering the firebox 308. In the event a fire is detected, a control system 309 (e.g., control unit) of the engine cooling system 300 triggers the valve actuator 314 of the fireproof valve 310 to close the fireproof valve 310 and substantially seal off the firebox 308 from other parts of the aircraft. Note that during this process, a valve body 316 of the fireproof valve 310 (e.g., internal surfaces of the fireproof valve 310) may be exposed to temperatures from the engine bay 312 of approximately 2000° Fahrenheit or greater, depending on the size and severity of the fire.

The control system 309 is configured to monitor operations of the engine cooling system 300, receive operator commands, and to control operation of the fireproof valves 310 and/or air drivers 304 in the event that a fire is detected. As shown in FIG. 4, the control system 309 includes a control unit 318, a user interface 320, and at least one sensor 322. In other embodiments, the control system 309 may include additional, fewer, and/or different components. In at least one embodiment, the control system 309 is part of a fire suppression system onboard the aircraft that is configured to warn the operator of a potential fire and/or to inject, dispense, or otherwise introduce a fire suppression agent into the engine bay 312 to combat the fire.

The control unit 318 (e.g., controller, control circuit, etc.) is configured to communicate with and coordinate operations between each of the sensor(s) 322, the user interface 320, the valve actuator 314, the air driver 304, and/or other parts of the control system 309. The control unit 318 may include a non-transitory computer readable medium or processor, having computer-readable instructions stored thereon that when executed cause the at least one control unit to carry out operations called for by the instructions. The control unit 318 may include a power source, a memory (e.g., database), a communications interface (e.g., an input/output (I/O) interface, a network interface, a transceiver, etc.), and a processor.

In at least one embodiment, the control unit 318 may be a computing device onboard the aircraft. In other embodiments, at least part of the control unit 318 may include a data cloud (e.g., server, etc.) that is located remotely from the aircraft. In some embodiments, the control unit 318 includes at least one circuit for controlling different flight operations. For example, the control unit 318 may include a fire detection circuit configured to measure a condition within the engine bay 312 and to determine whether a fire is present in the engine bay 312, a cooling control circuit configured to substantially seal off the engine bay 312 in the event of fire and to deactivate the air drivers 304 to prevent damage due to operation of the fireproof valves 310, and/or a fire suppression circuit configured to activate and control the introduction of a fire suppression agent into the engine bay 312 and/or to take other remedial measures with respect to the indication of a fire in the engine bay 312. In other embodiments, the control unit 318 may include additional, fewer, and/or different components.

As shown in FIG. 4, the control unit 318 is communicably coupled (e.g., electrically or wirelessly connected, etc.) to the sensor(s) 322, the valve actuator 314, the air driver 304, and the user interface 320. The valve actuator 314 and the air driver 304 may be the same as or substantially similar to the valve actuator 228 and the air driver 208, respectively, described with reference to FIGS. 1-3. The at least one sensor 322 is configured to monitor conditions within the engine bay 312 that are indicative of the presence of fire within the engine bay 312. In at least one embodiment, the sensor 322 is a temperature sensor that monitors a temperature of air within the engine bay 312. The temperature sensor may be disposed at least partially within the engine bay 312. In other embodiments, another form of fire detection sensor may be used including, but not limited to, a smoke sensor (e.g., optical sensor) configured to identify the presence of smoke in the engine bay 312, a carbon dioxide sensor, a carbon monoxide sensor, and/or another type sensor that is capable of being used for fire detection. The control unit 318 may be configured to receive signals from the sensor 322 and to determine the presence of fire within the engine bay 312 based on the signals. In some embodiments, the control unit 318 may be configured to determine a probability that fire exists within the engine bay and/or a severity level of fire within the engine bay 312 based on measurement data from the sensor(s) 322.

The user interface 320 is communicably coupled to the control unit 318 and is configured to output information from the at least one sensor 322. The user interface 320 is also configured to receive control inputs from the operator (e.g., control commands for the valve actuator and air driver, fire suppression system commands, etc.). In various embodiments, the user interface 320 includes a graphical user interface (e.g., a monitor, display, etc.). In some embodiments, the user interface 320 includes at least one component that is responsive to user inputs such as, but not limited to, at least one touch-sensitive region (e.g., touch-sensitive display), buttons, audio inputs such as microphones, levers, and/or knobs.

Figure 5:
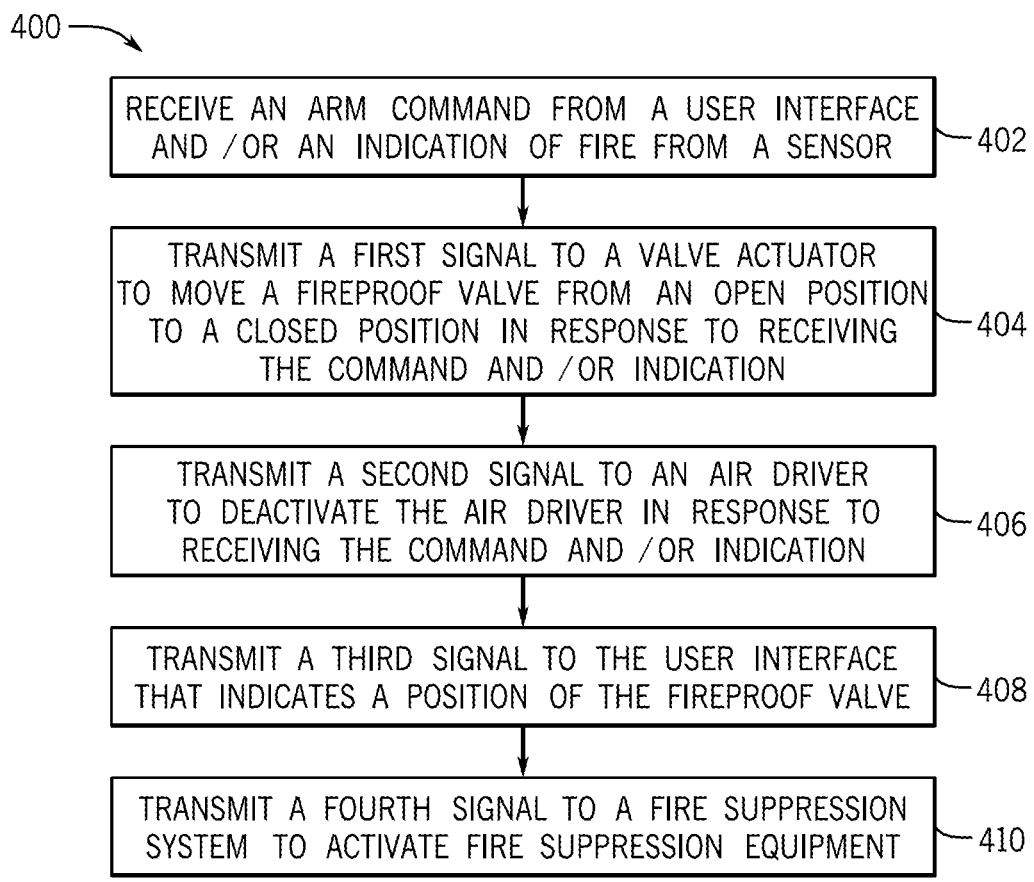
FIG. 5 is a flow diagram of a method of fire suppression in an aircraft using an engine cooling system, according to an embodiment.

Referring to FIG. 5, a flow diagram of a method 400 of fire suppression in an aircraft incorporating an engine cooling system is shown, according to at least one embodiment. The method 400 of FIG. 5 may be implemented with the control system 309 of FIG. 4. As such, the method will be described with regard to FIG. 4. In other embodiments, the method may include additional, fewer, and/or different operations.

At 402, the control unit (e.g., control unit 318) receives at least one of an operator command and/or an indication of fire within the engine bay from a sensor (e.g., sensor 322). In embodiments where the control system (e.g., control system 309) forms part of a fire control and/or suppression system for the aircraft, operation 402 may include receiving data from the sensor that is indicative of the presence of fire in the engine bay. Operation 402 may include converting the data to a measurement value by iterating through a lookup table with values of an environmental condition that correspond with the first value (e.g., a table of temperature values as a function of sensor voltage, etc.). Operation 402 may also include comparing the measured environmental condition in the engine bay to threshold values indicative of the presence of fire in the engine bay to determine if a fire is actually present. In the event that the measured environmental condition satisfies the threshold value (e.g., exceeds the threshold temperature, smoke obscuration, carbon dioxide levels, etc.), operation 402 may include transmitting a notification of the condition to the user interface (e.g., user interface 320) to alert the operator of the presence of fire.

Figure 6:
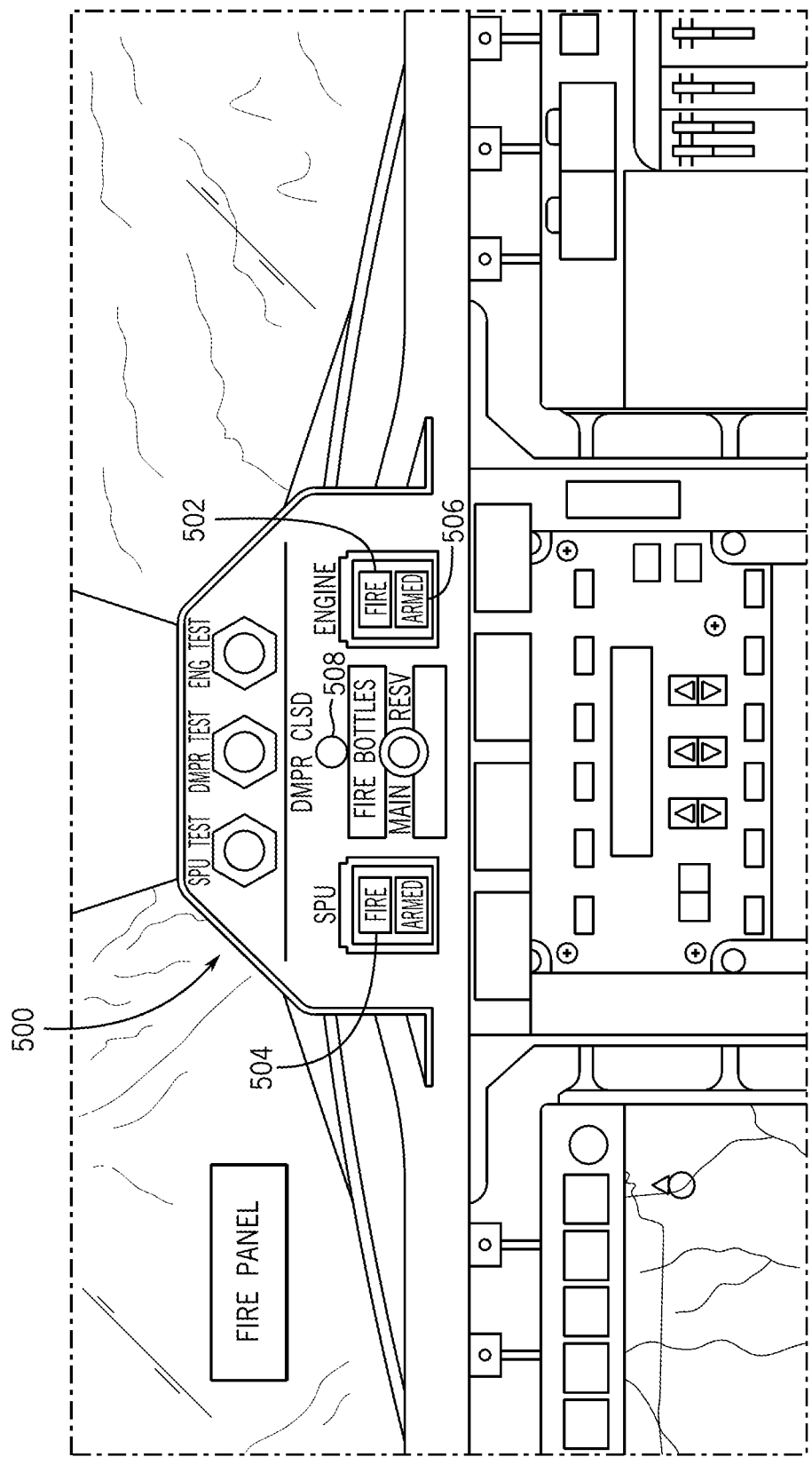
FIG. 6 is a front view of a fire panel of an aircraft, according to an embodiment.

For example, referring to FIG. 6, a front view of a control panel 500 (e.g., fire panel, etc.) of an aircraft is shown, according to at least one embodiment. The control panel 500 may include visual indicators (e.g., lights, display elements, icons, etc.) that inform the operator of the environmental condition within the engine bay and alert the operator when a fire is detected. In the embodiment of FIG. 6, the control panel 500 includes lights that illuminate when a fire is detected (e.g., a first light 502 that indicates the potential of fire proximate to the engine, and a second light 504 that indicates the presence of fire in any supplemental power unit for the aircraft). Operation 402 may further include providing an audible alert to notify the operator that a fire has been detected.

In response to the notification, the operator may take the necessary steps to confirm/verify the presence of fire in the engine bay. For example, the operator may conduct flight maneuvers that allow the operator to visually identify the presence of smoke/fire and its source. In an embodiment where the fireproof valve (e.g., fireproof valve 310) is controlled in response to user commands, operation 402 may include receiving an arm command from an operator of the aircraft via the control panel 500, for example, in response to arming the fire suppression system by selecting the appropriate button and/or icon from the control panel 500 and in preparation of further remedial measures. At 404, the control unit transmits a first signal to a valve actuator (e.g., valve actuator 314) of a fireproof valve (e.g., fireproof valve 310) to move the valve from an open position to a closed position in response to receiving the command and/or indication. In at least one embodiment, operation 404 includes transmitting the first signal to the valve actuator in response to detection of fire that persists for a threshold period of time. In some embodiments, transmitting the first signal includes transmitting a control signal to the valve actuator to close the valve. In response to the first signal, the valve actuator rapidly closes the fireproof valve to reduce the risk of fire escaping the engine bay and damaging other parts of the aircraft. In at least one embodiment, the valve actuator is configured to move the valve from the open position to the closed position with a closure period that is less than or equal to approximately 2 seconds.

At 406, the control unit transmits a second signal to an air driver (e.g., air driver 304) to deactivate the air driver in response to receiving the command and/or indication. In some embodiments, operations 404 and 406 may occur at substantially the same time (e.g., simultaneously). Operation 406 may include transmitting a control signal to the air driver to deactivate and thereby reduce the risk of damage due to the increase in backpressure caused by closure of the fireproof valve. In some embodiments, operation 406 further includes deactivating any auxiliary fans within the avionics bay of the aircraft.

At 408, the control unit transmits a third signal to the user interface that indicates a position of the fireproof valve. Operation 408 may include sending the third signal to the control panel 500 of FIG. 6, to activate an indicator light on the control panel 500 based on the position of the valve (e.g., a "closed" light, etc.). For example, operation 408 may include activating an indicator light that notifies the operator that they control system is armed (e.g., illuminating third light 506 and/or damper closed light 508).

At 410, the control unit transmits a fourth signal to a fire suppression system to activate fire suppression equipment. Operation 410 may include receiving a control command from the user interface (e.g., the control panel 500 of FIG. 6) and transmitting the fourth signal to an injector of an agent injecting system to introduce a fire suppression agent into the engine bay. Operation 410 may further include querying the sensors to determine whether a fire is still present in the engine bay and transmitting an indication of whether the fire has been extinguished to the user interface (e.g., be turning off the fire indicator light on the control panel 500). In at least one embodiment, the method 400 further includes opening the fireproof valve and activating the air driver in response to an indication that the fire in the engine bay has been extinguished and/or the fire suppression system has been disarmed.

Notwithstanding the embodiments described above in reference to FIGS. 1-6, various modifications and inclusions to those embodiments are contemplated and considered within the scope of the present disclosure.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. The systems and methods described herein may be embodied in other specific forms without departing from the characteristics thereof. The foregoing implementations are illustrative rather than limiting of the described systems and methods. The scope of the systems and methods described herein is thus indicated by the appended claims, rather than the foregoing description, and changes that come within the meaning and range of equivalency of the claims are embraced therein.

What is claimed is:

1. An aircraft, comprising:
   an airframe defining a first enclosed space;
   an engine bay disposed within the first enclosed space, the engine bay comprising:
      a firebox defining a second enclosed space; and
      an engine disposed at least partially within the second enclosed space; and
   a cooling system configured to selectively fluidly couple the first enclosed space with the second enclosed space, wherein the cooling system comprises:
      a valve repositionable between an open position and a closed position;
      a valve actuator coupled to the valve;
      a user interface; and
      a fire suppression controller communicably coupled to the valve actuator and the user interface, the fire suppression controller configured to:
         receive an arm command from the user interface;
         transmit a control signal to the valve actuator to move the valve from the open position to the closed position in response to receiving the arm command; and
         transmit a notification to the user interface that indicates a position of the valve.

2. The aircraft of claim 1, wherein the cooling system comprises:
   a fluid conduit coupled to the firebox and extending away from the firebox into the first enclosed space, wherein the valve is coupled to a first end of the fluid conduit proximate the firebox.

3. The aircraft of claim 2, wherein the firebox comprises a forward wall and a lower wall coupled to the forward wall and angled with respect to the forward wall, the fluid conduit coupled to a lower end of the forward wall proximate the lower wall.

4. The aircraft of claim 2, wherein the cooling system further comprises an air driver coupled to a second end of the fluid conduit opposite the first end.

5. The aircraft of claim 4, wherein the fluid conduit has an approximately constant hydraulic diameter between the first end and the second end that is approximately equal to a diameter of an outlet of the air driver.

6. The aircraft of claim 1, wherein the valve is configured to actuate from the open position to the closed position within a period that is less than or equal to approximately 2 seconds.

7. The aircraft of claim 1, wherein the valve is a fireproof valve structured to maintain operability when exposed to a temperature of approximately 2000 degrees Fahrenheit for a period greater than or equal to approximately 90 seconds.

8. The aircraft of claim 1, wherein the first enclosed space is an avionics bay housing avionics equipment for the aircraft.

9. The aircraft of claim 1, wherein the airframe defines a shell without any outlet openings that fluidly couple the first enclosed space to an exterior environment surrounding the shell during aircraft operations.

10. The aircraft of claim 1, wherein the cooling system further comprises:
    a thermal sensor disposed at least partially within the second enclosed space, wherein the fire suppression controller is communicably coupled to the thermal sensor and configured to transmit a control signal to the valve actuator in response to an indication of fire from the thermal sensor.

11. The aircraft of claim 1, further comprising an air driver configured to direct air from the first enclosed spaced to the second enclosed space through the valve, wherein in response to receiving the arm command, the fire suppression controller is further configured to transmit a second control signal to the air driver to deactivate the air driver.

12. An engine cooling system for an aircraft, comprising:
    a fire resistant bulkhead having a forward wall and a lower wall coupled to the forward wall and angled with respect to the forward wall, the forward wall and the lower wall together defining an at least partially enclosed space sized to receive an engine therein;
    a fluid conduit coupled at a proximal end of the fluid conduit to one of the forward wall or the lower wall and extending away from the at least partially enclosed space to a distal end of the fluid conduit;
    a valve coupled to the proximal end of the fluid conduit proximate the fire resistant bulkhead and configured to control a flow of air through the fluid conduit; and
    an air driver coupled to the distal end of the fluid conduit opposite the proximal end.

13. The engine cooling system of claim 12, wherein the fluid conduit is coupled to a lower end of the forward wall proximate the lower wall.

14. The engine cooling system of claim 12, wherein the valve is configured to actuate from an open position to a closed position within a period that is less than or equal to approximately 2 seconds.

15. The engine cooling system of claim 12, wherein the valve includes an electronically actuated fireproof valve structured to maintain operability when exposed to a temperature of 2000 degrees Fahrenheit for a period greater than or equal to approximately 90 seconds.

16. An engine cooling system for an aircraft, comprising:
    a fireproof valve repositionable between an open position and a closed position;
    a valve actuator coupled to the fireproof valve;
    a user interface; and
    a fire suppression controller communicably coupled to the valve actuator and the user interface, the fire suppression controller configured to:
       receive an arm command from the user interface;
       transmit a first signal to the valve actuator to move the fireproof valve from the open position to the closed position in response to receiving the arm command; and
       transmit a second signal to the user interface that indicates a position of the fireproof valve.

17. The engine cooling system of claim 16, further comprising a thermal sensor configured to provide an indication of fire within a space, wherein the fire suppression controller is communicably coupled to the thermal sensor, and wherein the fire suppression controller is configured to transmit the first signal to the valve actuator to close the fireproof valve in response to the indication of fire from the thermal sensor.

18. The engine cooling system of claim 16, further comprising an air driver configured to couple to a fluid conduit and to direct air through the fluid conduit, wherein in response to receiving the arm command, the fire suppression controller is further configured to transmit a third signal to the air driver to deactivate the air driver.

19. The engine cooling system of claim 16, further comprising a thermal sensor configured to provide an indication of fire within a space, wherein the fire suppression controller is communicably coupled to the thermal sensor, and wherein the fire suppression controller is configured to generate, via the user interface, an audible and visual alert in response to the indication of fire from the thermal sensor.

20. The engine cooling system of claim 12, wherein the valve couples the fluid conduit to one of the forward wall or the lower wall.

* * * * *